April 27, 1926.

A. ZEIHER ET AL 1,582,154

PRESSURE CONTROLLED INDICATOR FOR MOTORS

Filed Jan. 7, 1925

Witnesses:

Inventors:
Albert Zeiher &
John H. Zeiher
By Joshua R. H. Potts
Their Attorney

Patented Apr. 27, 1926.

1,582,154

UNITED STATES PATENT OFFICE.

ALBERT ZEIHER AND JOHN E. ZEIHER, OF SEATTLE, WASHINGTON.

PRESSURE-CONTROLLED INDICATOR FOR MOTORS.

Application filed January 7, 1925. Serial No. 984.

*To all whom it may concern:*

Be it known that we, ALBERT ZEIHER and JOHN E. ZEIHER, citizens of the United States, and residents of the city of Seattle, county of King, and State of Washington, respectively, have invented certain new and useful Improvements in a Pressure-Controlled Indicator for Motors, of which the following is a specification.

Our invention relates to a pressure-controlled indicator for motors, especially adapted for use in connection with a pump operated oil pressure system to give warning when the oil pressure fails, and our invention has for its paramount object the provision of an improved device of this character which will be simple in construction, highly efficient in operation and economical in manufacture.

Other objects will appear hereinafter.

The invention consists in the combination and arrangement of parts, hereinafter described and claimed.

The invention will be best understood by reference to the accompanying drawings forming a part of this specification, and in which, Fig. 1 is a diagrammatical view showing the incorporation of our device in the line of an oil pressure system for a motor;

The preferred embodiment of our invention, as illustrated in the accompanying drawing, includes an oil pressure casing 5 from which the oil pipes 6 and 7 extend in opposite directions. As herein shown, the oil pressure casing 5 is made disc-shaped in form in order to provide a circular oil pressure chamber 8 with which the oil pipes 6 and 7 communicate through the circular wall 9.

Figure 1:
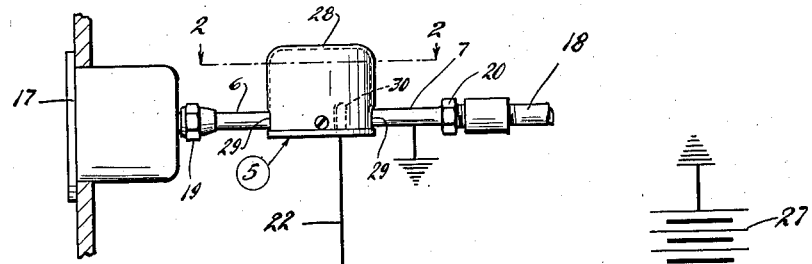
Figure 2:
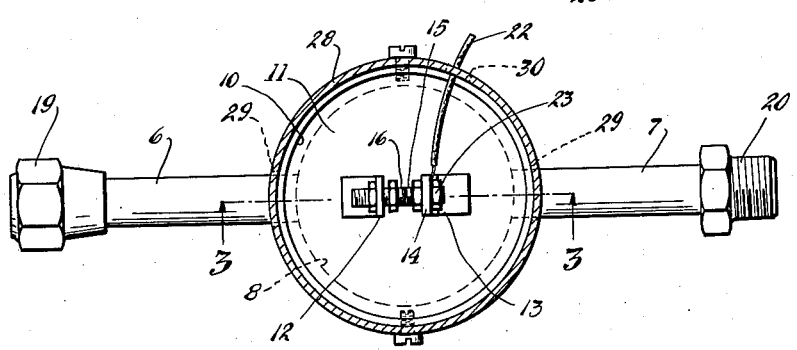
Fig. 2 is a top plan view of our device, the same being shown in section taken on the line 2—2 of Fig. 1.
Figure 3:
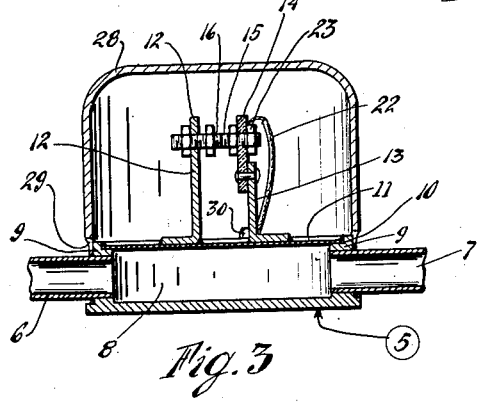
Fig. 3 shows a central vertical section taken on the line 3—3 of Fig. 2, the diaphragm here being shown in deflexed position.
Figure 4:
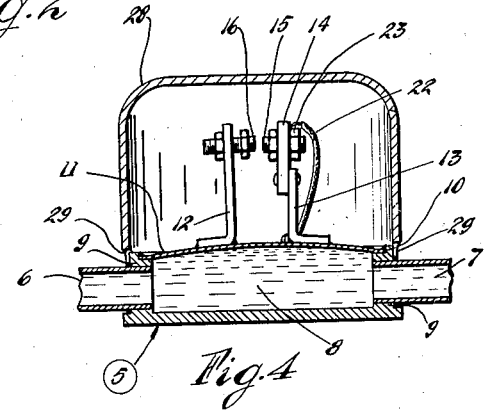
Fig. 4 is a similar view of a device but with the diaphragm shown in flexed position.

On its top or upper side the circular wall 9 is provided with an annular seat 10 in which is fitted and secured airtight by soldering or other suitable means a metallic diaphragm 11 made preferably of brass and adapted to respond to oil pressure within the oil pressure chamber 8. Secured upon and rising from the diaphragm 11 are confronting bracket members 12 and 13, of which the bracket member 13 is of shorter length than the bracket member 12 and carries an insulation block 14 in which is held a contact point 15 directly opposite a similar contact point 16 screw threaded for adjustment in the bracket member 12. This arrangement is such that when the oil pressure fails within the chamber 8, the diaphragm 11 will be deflexed, occupying the position shown in Fig. 3 with the contact points 15 and 16 drawn into engagement; and that when there is proper oil pressure in the chamber 8, the said diaphragm will be flexed as shown in Fig. 4, to tilt the bracket members 12 and 13 away from each other separating the contact points 15 and 16.

Our attachment may be incorporated in any suitable manner in an oil pressure line for a motor. As herein depicted, our attachment is incorporated in the oil pressure line between the oil gauge 17 and the oil pipe 18 leading to the oil pump (not shown). To this end, the oil pipe 6 is provided with a coupling portion 19 adapted to be coupled to the oil gauge 17, while the oil pipe 7 is provided with a coupling portion 20 for suitable connection with the oil pipe 18. In order to give audible alarm when the oil pressure fails within the chamber 8, the cooperating contact points 15 and 16 are connected in electrical circuit with an alarm 21. For this purpose, a wire conductor 22 is bound upon the contact point 15 by a securing nut 23 and extends to one side of the alarm 21, from the opposite side of which a conductor 24 leads to the ignition switch 25, a wire 26 extending from said switch to any suitable source of power such as a battery 27. The return circuit is preferably made through the parts (not shown) of the motor or automobile, the said battery 27 being grounded for this purpose and the oil pipe 7 also being suitably grounded, the current flowing from said pipe 7 through the diaphragm 11, bracket member 12 and contact point 16. In this manner the cooperating contact points may be connected in circuit with the alarm 21 and ignition switch 25 so that whenever the last named is in "on" position an alarm will sound instantly upon the failure of oil pressure within the oil pressure chamber 8. Those familiar with oil pressure systems for motors will appreciate that the failure of oil pressure may be due to a variety of causes such, for instance, as a loss of oil due to leakage or other reasons, mechanical trouble in the action of the oil pump, and the like. Our device is also of use in giving warning when the ignition switch is left "on" with the motor stopped as often happens when the motor is stalled.

The diaphragm 11 and parts supported thereby are preferably enclosed by a cover 28 designed to embrace the circular wall 9 of the oil pressure casing 5, the said cover 28 being suitably slotted at points as at 29 in order to clear the projecting oil pipes 6 and 7. It is also provided with an aperture 30 through which the electric conductor 22 is extended.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. In combination, a flexible diaphragm and means for actuating the same, a pair of contacts having support entirely upon the diaphragm for movement therewith, said contacts being positioned for engagement with each other on the movement of the diaphragm in one direction, substantially as described.

2. In combination, a flexible diaphragm and means for actuating the same, a pair of members projecting from the diaphragm and movable therewith; and contacts arranged on the projecting members in position to be engaged with each other when the projecting members are moved through the movement of the diaphragm in one direction, substantially as described.

3. A device of the character described comprising a fluid pressure system having a flexible diaphragm sensitive to fluid pressure, and a pair of contacts arranged upon and movable with the diaphragm and adapted to be engaged with each other on the actuation of the diaphragm in response to failure of oil pressure, substantially as described.

4. A device of the character described comprising an oil pressure system having a flexible diaphragm, and a pair of contacts arranged upon and movable with the diaphragm and adapted to be engaged with each other upon the deflexing of the diaphragm in response to failure of oil pressure, substantially as described.

5. A device of the character described comprising an oil pressure casing constituting part of an oil pressure system, a diaphragm constituting a wall of said casing, a pair of contacts arranged upon and movable with the diaphragm and adapted to be engaged with each other on the deflexing of the diaphragm in response to failure of oil pressure, substantially as described.

6. A device of the character described comprising an oil pressure casing, a diaphragm sensitive to oil pressure constituting a wall thereof, a pair of supporting members fixed on the diaphragm and movable therewith, and contact members carried by the supporting members, one being insulated from its supporting member, and one being adjustable on its supporting member, said contacts being arranged for engagement on the deflexing of the diaphragm, substantially as described.

7. An attachment for an oil pressure system comprising a disc-shaped oil pressure casing having means for incorporation in the line of an oil pressure system, a flexible diaphragm constituting the top wall of the pressure casing, a pair of contact members arranged on and movable with the diaphragm, said contacts being positioned for engagement upon the deflexing of the diaphragm on failure of oil pressure, and a cover for enclosing the diaphragm and contacts, substantially as described.

In testimony whereof we have signed our names to this specification.

ALBERT ZEIHER.
JOHN E. ZEIHER.